(12) United States Patent
Goossens

(10) Patent No.: US 11,025,133 B2
(45) Date of Patent: Jun. 1, 2021

(54) ELECTRIC MOTOR BRAKE

(71) Applicant: Dana Automotive Systems Group, LLC, Maumee, OH (US)

(72) Inventor: Stijn Goossens, Erpe-Mere (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 95 days.

(21) Appl. No.: 16/280,398

(22) Filed: Feb. 20, 2019

(65) Prior Publication Data
US 2020/0266682 A1    Aug. 20, 2020

(51) Int. Cl.
*H02K 7/102* (2006.01)
*H02K 7/12* (2006.01)
*F16D 121/20* (2012.01)

(52) U.S. Cl.
CPC ........... *H02K 7/1023* (2013.01); *H02K 7/125* (2013.01); *F16D 2121/20* (2013.01)

(58) Field of Classification Search
CPC .... H02K 7/102; H02K 7/1021; H02K 7/1023; H02K 7/1026; H02K 7/1025; H02K 7/1028; H02K 7/104; H02K 7/125; H02K 11/21; H02K 11/215; H02K 9/22; H02K 9/223; H02K 9/227; H02K 11/38; F16D 2121/20
USPC .......................................... 310/68 B, 77, 78
See application file for complete search history.

(56) References Cited

U.S. PATENT DOCUMENTS

| | | | |
|---|---|---|---|
| 9,847,693 B2 | 12/2017 | Huang | |
| 9,912,280 B2 | 3/2018 | Suzuki | |
| 9,914,362 B2 | 3/2018 | Ngo et al. | |
| 2003/0218392 A1* | 11/2003 | Frey | H02K 5/148 310/68 B |
| 2007/0251793 A1* | 11/2007 | Swensgard | F16D 28/00 192/40 |
| 2011/0140557 A1* | 6/2011 | Miyairi | H02K 7/06 310/77 |
| 2013/0340560 A1* | 12/2013 | Burridge | B25J 17/025 74/490.05 |
| 2018/0009426 A1 | 1/2018 | Masuda | |
| 2018/0013360 A1 | 1/2018 | Eshleman et al. | |
| 2018/0019646 A1 | 1/2018 | Quick et al. | |
| 2018/0034395 A1 | 2/2018 | Huang et al. | |
| 2018/0062546 A1 | 3/2018 | Xiang et al. | |

(Continued)

FOREIGN PATENT DOCUMENTS

| | | | | |
|---|---|---|---|---|
| DE | 102016214629 A1 * | 2/2018 | ............. | F02B 75/04 |
| JP | 57199449 A * | 12/1982 | ............. | H02K 7/104 |
| WO | 2018032617 A1 | 2/2018 | | |

OTHER PUBLICATIONS

Nehmeyer, Machine Translation of DE102016214629, Feb. 2018 (Year: 2018).*

(Continued)

*Primary Examiner* — Quyen P Leung
*Assistant Examiner* — Eric Johnson
(74) *Attorney, Agent, or Firm* — McCoy Russell LLP

(57) ABSTRACT

An electric motor including a rotor, a stator disposed adjacent to the rotor, and a brake mechanism. The stator is configured to cause a rotational movement of the rotor during operation of the electric motor and the brake mechanism is configured to selectively maintain a stationary rotational position of the rotor against a force exerted by an external source.

19 Claims, 4 Drawing Sheets

(56) References Cited

U.S. PATENT DOCUMENTS

| | | |
|---|---|---|
| 2018/0065221 A1 | 3/2018 | Cheng et al. |
| 2018/0067166 A1 | 3/2018 | Bock et al. |
| 2018/0069465 A1 | 3/2018 | Rezaee |
| 2018/0069493 A1 | 3/2018 | Roberts |
| 2018/0072308 A1 | 3/2018 | Miyaishi et al. |
| 2018/0073585 A1 | 3/2018 | Masuda |
| 2018/0076701 A1 | 3/2018 | Hunter et al. |
| 2019/0101175 A1* | 4/2019 | Chandrasekara ......... G01L 5/28 |

OTHER PUBLICATIONS

Azuma, Machine Translation of JP57199449, Dec. 1982 (Year: 1982).*

* cited by examiner

ELECTRIC MOTOR BRAKE

FIELD

The subject matter of the embodiments described herein is directed toward an electric motor, and more particularly to an electric motor having an integrated brake configured to maintain a stationary position of the rotor.

BACKGROUND

Electric motors are used in applications across many industries including automotive, aerospace, consumer, medical, industrial automation equipment and instrumentation applications. An electric motor includes a stator with electromagnetic poles with windings thereon and a rotor with magnets mounted on a surface thereof creating permanent magnetic poles. The stator and the rotor magnetically interact with each other when electric current flows in the windings. The electric motors require a supply of electrical current to the windings that is synchronized to the rotor position. The flow of the electrical current through each of windings is performed at a synchronized time to form a continuous rotating magnetic field, which can be achieved as a rotor position is recognized. A continued rotation of the rotor is achieved by repeating the operational sequence many times over.

In certain applications, however, there is a need to cease the rotation of the rotor and maintain a stationary position thereof against a force exerted by an external source. The stator of the conventional electric motor, however, is configured to achieve certain performance requirements for normal operation. As such, a supply of relatively large and continuous electrical current through the windings of the stator can lead to overheating and failure of the electric motor.

It would be desirable to produce an electric motor having an integrated brake mechanism that is configured to maintain a stationary position of the rotor.

SUMMARY

In concordance and agreement with the present disclosure, an electric motor having an integrated brake mechanism that is configured to maintain a stationary position of the rotor, has surprisingly been discovered.

In one embodiment, an electric motor, comprises: a casing; a rotor disposed in the casing; a stator disposed in the casing adjacent to the rotor; a shaft at least partially disposed in the casing and rotatable with the rotor; and a brake mechanism disposed in the casing, wherein the brake mechanism is configured to selectively maintain a stationary position of the shaft by exerting a resistive force thereupon.

In another embodiment, an electric motor, comprises: a casing; a rotor disposed in the casing; a stator disposed in the casing adjacent to the rotor; a shaft disposed in the casing and rotatable with the rotor; a sensor disposed in the casing and configured to sense a position of the rotor; a thermal energy transfer member disposed in the casing; a brake mechanism disposed adjacent to the shaft, the sensor, and the thermal energy transfer member, the brake mechanism including at least one field component, wherein the brake mechanism is configured to selectively maintain a stationary position of the rotor by exerting a resistive force upon the shaft; and a controller disposed in the casing adjacent to the thermal energy transfer member, wherein the controller is in electrical communication with the stator, the sensor, and the brake mechanism.

In yet another embodiment, a method for controlling an electric motor, the method comprises the steps of: providing an electric motor including a casing having a rotor, a stator disposed adjacent to the rotor, a shaft rotatable with the rotor, and a brake mechanism disposed therein; and selectively supplying an electrical current to one of the stator to cause a rotational movement of the rotor and a brake mechanism to maintain a stationary position of the rotor by exerting a resistive force upon the shaft.

As aspects of certain embodiments, the resistive force is one of a mechanical resistive force and a magnetic resistive force.

As aspects of certain embodiments, the brake mechanism includes at least one of an armature and a field component.

As aspects of certain embodiments, at least one of the armature and field component is disposed about the shaft.

As aspects of certain embodiments, the armature is slidably coupled to the shaft.

As aspects of certain embodiments, the field component includes one of a permanent magnet and an electromagnet disposed in a housing.

As aspects of certain embodiments, an energization of the field component generates a magnetic field which causes a movement of the armature from a first position to a second position, and wherein the armature in the second position exerts a mechanical resistive force upon the shaft.

As aspects of certain embodiments, an energization of the field component generates eddy currents and a magnetic field to exert a magnetic resistive force upon the shaft.

As aspects of certain embodiments, the electric motor further comprises: a thermal energy transfer member disposed in the casing adjacent to the brake mechanism.

As aspects of certain embodiments, the electric motor further comprises: a controller disposed in the casing, wherein the controller is in electrical communication with at least one of the stator and the brake mechanism, and wherein the controller is configured to selectively control a supply of electrical current to at least one of the stator and the brake mechanism.

As aspects of certain embodiments, the controller is in electrical communication with the brake mechanism via at least one connection.

As aspects of certain embodiments, the electric motor further comprises: a position sensor disposed within the casing adjacent to at least one of the rotor and the shaft.

As aspects of certain embodiments, the brake mechanism is concentrically disposed about the sensor.

As aspects of certain embodiments, the shaft is drivingly connected to a clutch assembly.

As aspects of certain embodiments, the at least one field component of the brake mechanism includes at least one of a permanent magnet and an electromagnet disposed in a housing.

As aspects of certain embodiments, the thermal energy transfer member forms a portion of the housing of the at least one field component.

As aspects of certain embodiments, the shaft includes a gear disposed thereon, the gear configured to actuate a clutch assembly.

As aspects of certain embodiments, a torque constant of the resistive force exerted on the shaft is greater than a torque constant of the force exerted on the shaft by an external source.

BRIEF DESCRIPTION OF THE DRAWINGS

The above, as well as other advantages of the present embodiments, will become readily apparent to those skilled in the art from the following detailed description when considered in the light of the accompanying drawings in which.

DETAILED DESCRIPTION OF THE EMBODIMENTS

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the inventive concepts defined in herein. Hence, specific dimensions, directions or other physical characteristics relating to the embodiments disclosed are not to be considered as limiting.

Figure 1:
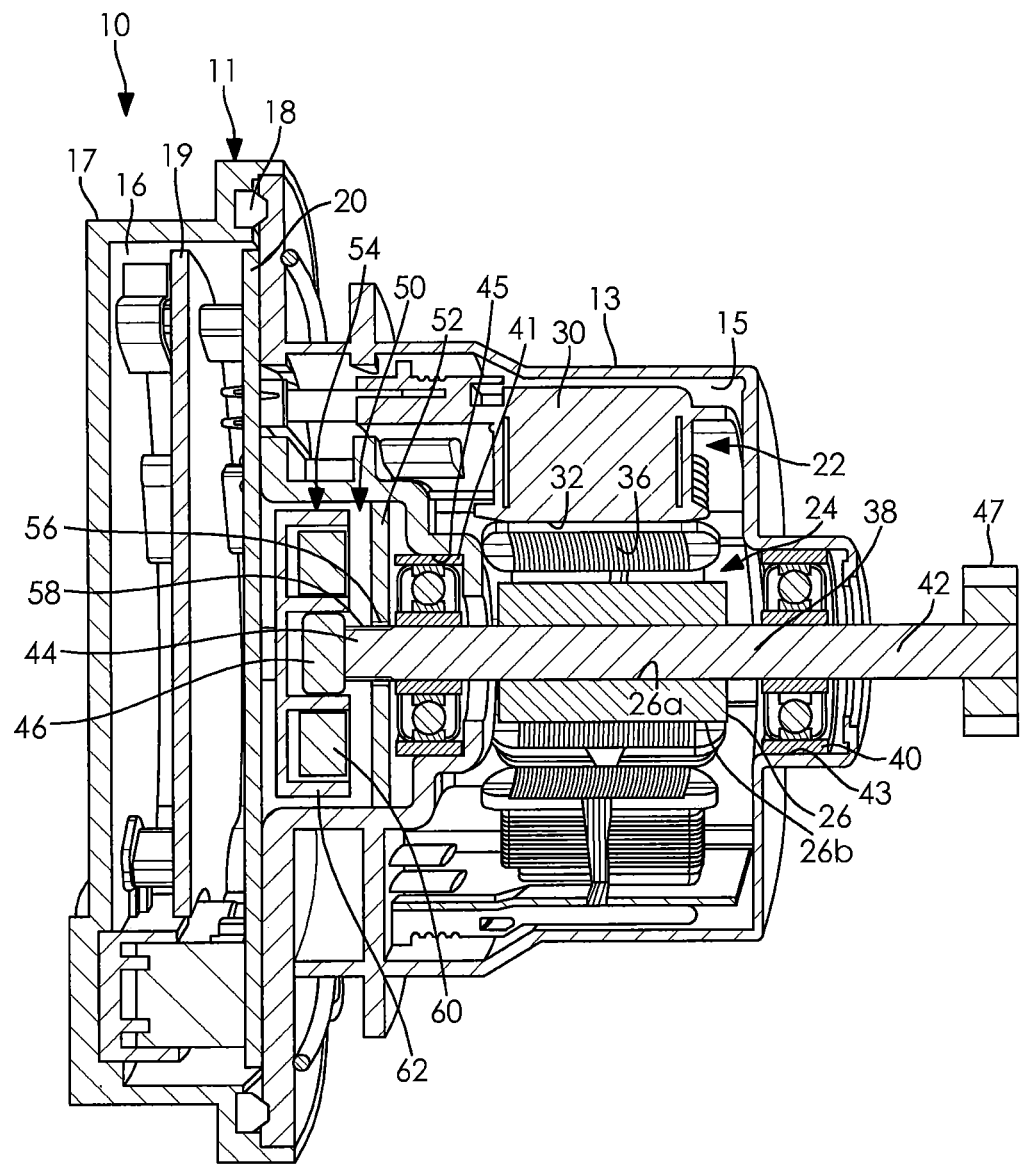
FIG. 1 is a sectional view taken along a longitudinal axis of an electric motor according to an embodiment of the subject disclosure, the electric motor including a brake mechanism which produces a mechanical resistive force, wherein the brake mechanism is in a disengaged position.
Figure 2:
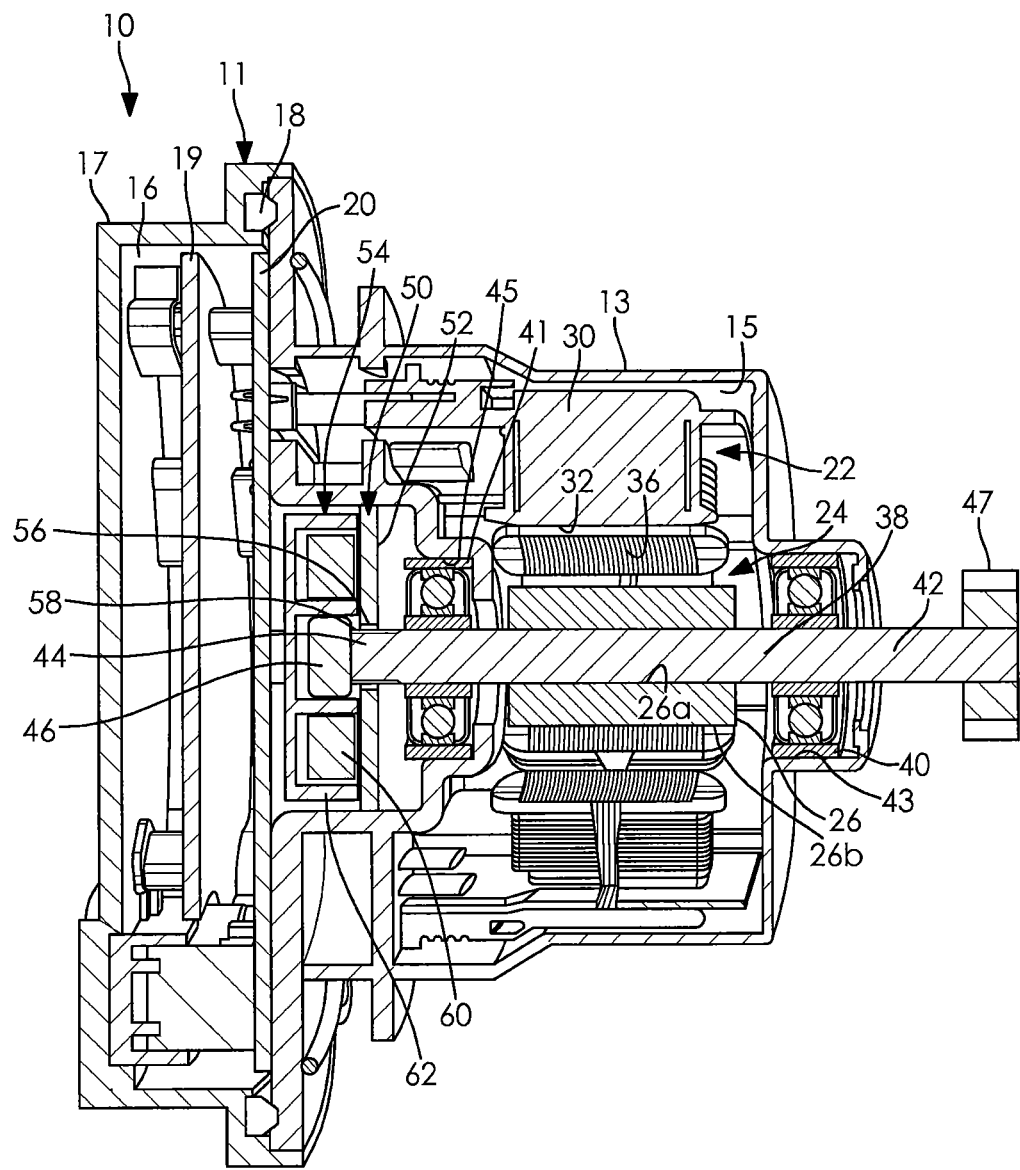
FIG. 2 is a sectional view of the embodiment of the electric motor shown in FIG. 1, wherein the brake mechanism is in an engaged position.

FIGS. 1-2 depict an electric motor 10 according one embodiment of the present subject matter. The electric motor 10 includes a casing 11 having a main body 13, which defines a first cavity 15 and a second cavity 16, and a cover 17 which further defines the second cavity 16. A sealing member 18 may be disposed between the main body 13 and the cover 17 to militate against contaminates and debris entering the cavities 15, 16. It is understood that the casing 11 can be any size and shape as desired. A controller 19 (e.g. a printed circuit board) and a thermal energy transfer member 20 may be disposed in the casing 11. As shown, the thermal energy transfer member 20 abuts the main body 13 of the casing 11 to define a chamber 21 within the second cavity 16. It should be appreciated, however, that the controller 19 and the thermal energy transfer member 20 can be disposed at any position within or outside of the casing 11 as desired.

In the present embodiment, the electric motor 10 includes a stator 22 and a rotor 24 disposed within the first cavity 15 of the casing 11. The rotor 24 is rotatable relative to the stator 22 to convert electrical power to mechanical power. In the embodiment shown in FIGS. 1-2, the stator 22 is an outer stator and the rotor 24 is an inner rotor. It is understood, however, that the electric motor 10 may include an inner stator and an outer rotor if desired. It is also appreciated that the electric motor 10 may include additional stators 22 and rotors 24 if desired.

In preferred embodiments, the stator 22 is configured to achieve certain performance requirements and selectively cause a rotational movement of the rotor 24 for normal operation of the electric motor 10. As illustrated in FIGS. 1-2, the stator 22 includes a cylindrical stator core 30 having a central aperture 32 formed axially therethrough. The rotor 24 is disposed within the central aperture 32 of the stator 22. A plurality of pole arms 34 with radial windings 36 wound therearound, as shown in FIGS. 1-2, generating a torque constant. The pole arms 34 extend radially inward from the stator core 30 of the stator 22 toward the rotor 24. In one preferred embodiment, the pole arms 34 are positioned circumferentially equidistant from each other around the stator core 30 of the stator 22. It should be appreciated that the stator 22 may include any number of the pole arms 34 as desired.

As illustrated, the rotor 24 includes a cylindrical rotor core 26. The rotor core 26 may be made from any material as desired such as a ferromagnetic material, for example. The rotor core 26 has a peripheral inner surface 26a and a peripheral outer surface 26b. The peripheral outer surface 26b of the rotor core 26 may include a plurality of magnets (not depicted) mounted thereon. It is understood that that the magnets may be permanent magnets if desired. In certain embodiments, the magnets may be bonded to the rotor core 26. In other embodiments, a rotor banding or retaining ring structure may be used to secure the magnets to the rotor core 26. The magnets form a generally ring-shaped structure about the rotor core 26 so that a peripheral inner surface of each of the magnets is adjacent to the peripheral outer surface 26b of the rotor core 26. In certain other embodiments, the magnets are disposed within the rotor core 26. The magnets are equally circumferentially spaced apart and radially outwardly extending within the rotor core 26. In certain embodiments, the rotor core 26 may include a central core (not depicted) formed from a non-magnetic material. A peripheral outer surface of each of the magnets is adjacent to a peripheral inner surface 22a of the stator 22 so that the rotor 24 may have induction with the stator 22. It is understood that many other types of stators 22 and rotors 24 having various other magnet configurations can be used in the electric motor 10 if desired. In the embodiments, the magnets form alternatingly disposed magnetic poles commonly known as a north pole "N" and a south pole "S". The number of magnetic poles can vary depending on an application of the electric motor 10.

An output shaft 38 is coupled to the rotor core 26 of the rotor 24. The output shaft 38 may be coupled to the rotor 24 by any method as desired. It is understood, however, that the rotor core 26 and the output shaft 38 may be a unitary structure if desired. The output shaft 38 shown is integrally formed with a driveshaft of the electric motor 10. In certain embodiments, the output shaft 38 is a separate and distinct component and is coupled to the driveshaft of the electric motor 10. As illustrated in FIGS. 1-2, the output shaft 38 is rotatably supported in the casing 11 by a pair of bearings 40, 41. Various types of bearings 40, 41 may be employed as desired such as ball bearings, roller bearings, tapered bearings, and the like, for example. In an embodiment, the bearing 40 is disposed in the first cavity 15 of the casing 11 and the bearing 41 is disposed in the second cavity 16 thereof. More particularly, the bearings 40, 41 may be disposed in sockets 43, 45, respectively, formed in the main body 13 of the casing 11. In certain embodiments, a first end 42 of the output shaft 38 is supported within the first cavity 15 by the bearing 40. The first end 42 of the output shaft 38 extends outwardly from the rotor 14 through the first cavity 15 and outwardly from the casing 11. The first end 42 of the output shaft 38 may be configured for connection to a driven component (not depicted). In certain embodiments, the first end 42 of the output shaft 38 includes a gear 47 disposed thereon to drivingly engage an actuator mechanism for a clutch assembly (not depicted). It should be appreciated that the gear 47 may be integrally formed with the first end 42 of the output shaft 38 if desired.

A second end 44 of the output shaft 38 is supported within the second cavity 16 by the bearing 41. The second end 44 of the output shaft 38 extends outwardly from the rotor 14 and into the second cavity 16 of the casing 11. In certain embodiments, the second end 44 of the output shaft 38 is coupled to a position sensor 46. The position sensor 46 is employed to determine a rotational position of the rotor 24. The position sensor 46 may be in electrical communication with the controller 19 to transmit the rotational position of the rotor 24 thereto. In one embodiment, the position sensor 46 is coupled to at least one of the casing 11 and the controller 19. In yet another embodiment, the position sensor 46 may be freely disposed with the casing 11. Various types of sensors may be employed for the position sensor 46. In certain embodiments, the position sensor 46 can be, but is not limited to, a magnetic sensor, for example, a Hall effect sensor or coil, for example. It is understood that other types of sensors may be employed depending on the application of the electric motor 10.

A brake mechanism 50 is disposed in the second cavity 16 of the casing 11. As illustrated, the brake mechanism 50 is disposed adjacent to the thermal energy transfer member 20. The thermal energy transfer member 20 provides the brake mechanism 50 with a conduit to permit a thermal energy transfer from the brake mechanism 50 and a cooling thereof. As such, the brake mechanism 50 does not require a separate cooling system, which minimizes a package size of the electric motor 10. The brake mechanism 50 may be one of a mechanical resistance brake (e.g. an electromagnetic brake) and a magnetic force brake (e.g. an eddy current brake). In certain embodiments shown, the brake mechanism 50 is a mechanical resistive force brake including a magnetic armature 52 and a field component 54. The armature 52 may be a friction plate disposed adjacent to the rotor 24 and the field component 54. The armature 52 is coupled to the output shaft 38 such that an axial movement of the armature 52 along the output shaft 38 between a first position, shown in FIG. 1, and a second position, shown in FIG. 2, is permitted while a rotational movement about the output shaft 38 is militated against. In certain embodiments, the armature 52 is slidably coupled to the output shaft 38 by a plurality of splines 56 formed on the armature 52 in engagement with a plurality of splines 58 formed on the output shaft 38. In other embodiments, the armature 52 is fixedly coupled to the output shaft 38. It is understood that the armature 52 may be coupled to the output shaft 38 by any method as desired.

The field component 54 of the brake mechanism 50 is disposed in the chamber 21 of the second cavity 16 axially adjacent to the armature 52. A biasing element (not shown) may be disposed between the armature 52 and the field component 54 to exert a biasing force on the armature 52 to urge the armature 52 in a first axial direction towards the first position thereof along the output shaft 38. The field component 54 may also be disposed about the second end 44 of the output shaft 38 and the position sensor 46. The field component 54 includes at least one of a permanent magnet (not shown) and an electromagnet 60 formed by a conducting coil, as shown in FIGS. 1-2. The field component 54 is configured to selectively generate a magnetic field to attract the armature 52. In certain embodiments, the field component 54 selectively causes the armature 52 to move in a second axial direction towards the second position thereof along the output shaft 38. The armature 52 in the second position thereof along the output shaft 38 is adjacent to or abuts the field component 54 generating a mechanical resistance therebetween. The mechanical resistance between the armature 52 and the field component 54 may selectively maintain a stationary position of the output shaft 38, and therefore the rotor 24 against a force exerted by an external source. In certain embodiments, the mechanical resistance between the armature 52 and the field component 54 provides a greater torque constant than the torque constant of the stator 22 so that less electrical current is required to maintain the stationary position of the rotor 24 than is required during normal operation of the electric motor 10.

In certain embodiments shown in FIGS. 1-2, the field component 54 is disposed within a housing 62, which is fixedly coupled to the casing 11. In other embodiments shown in FIG. 3, the thermal energy transfer member 20 is produced from a ferromagnetic material and forms a portion of the housing 62 of the field component 54, which further minimizes a package size of the brake mechanism 50, and thereby the electric motor 10. As such, the thermal energy transfer member 20 forms part of the magnetic field.

Figure 3:
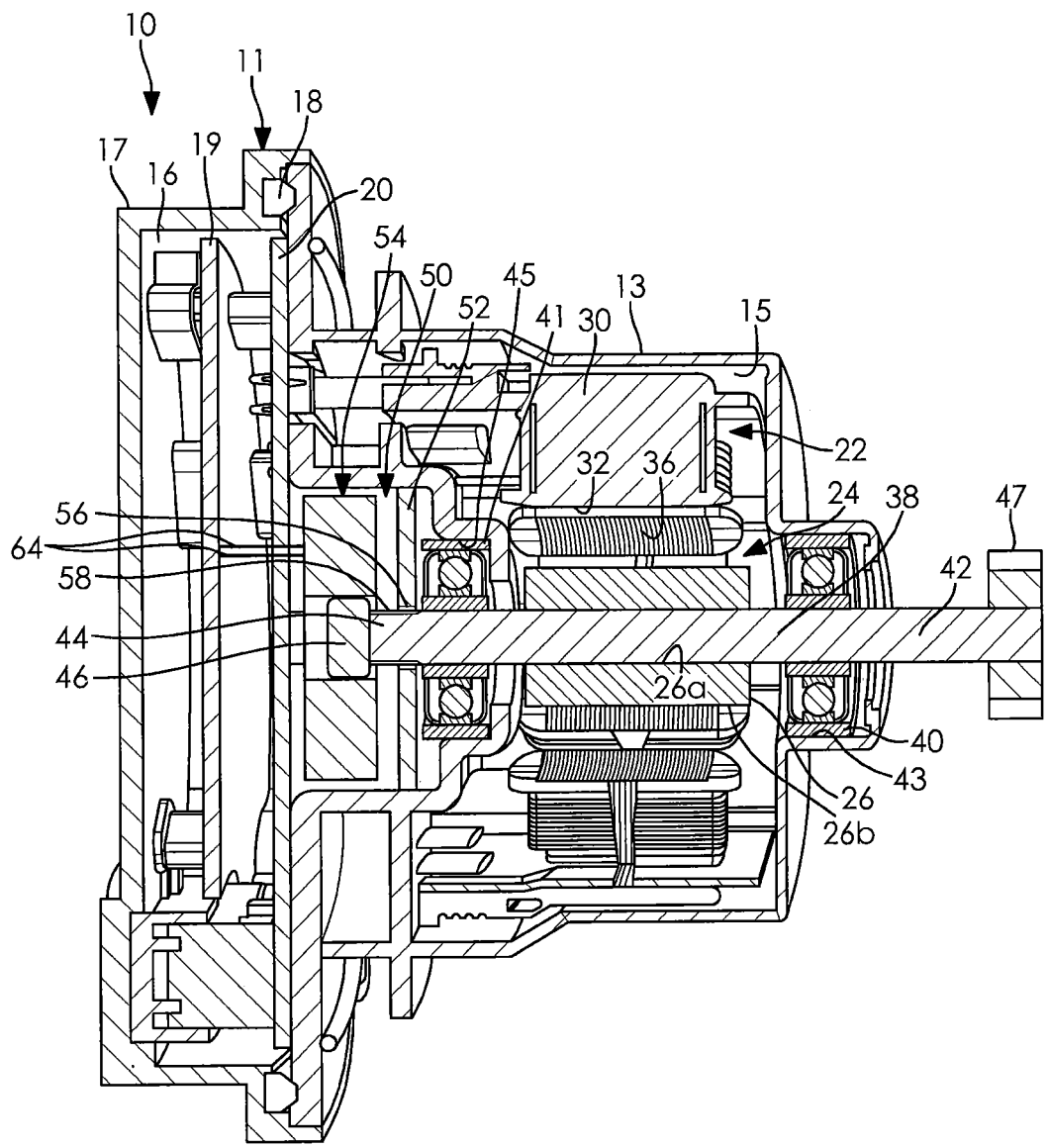
FIG. 3 is a sectional view taken along a longitudinal axis of an electric motor according to another embodiment of the subject disclosure, the electric motor including a brake mechanism which produces a mechanical resistive force, wherein an electrical connection between a controller and the brake mechanism is shown and a thermal energy transfer member forms a portion of a housing for a field component of the brake mechanism.

In certain embodiments shown in FIG. 3, the electric motor 10 further includes at least one electrical connection 64 between the controller 19 and the brake mechanism 50. More particularly, the electrical connection 64 shown connects the controller 19 and the field component 54 of the brake mechanism 50. The electrical connection 64 provides electrical communication between the controller 19 and the field component 54 of the brake mechanism 50. Accordingly, separate wiring for the brake mechanism 50 to an external power source and/or controller is not necessary, which minimizes a package size of the electric motor 10.

The controller 19 is configured to control a supply of electrical current to the windings 36 of the stator 22. The electrical current in the windings 36 of the stator 22 generates a magnetic field, which produces torque by interaction with the permanent magnets pushing the rotor 24 to rotate about the output shaft 38 to a new position. A rotational speed of the electric motor 10 can be adjusted by the controller 19 by varying the supply of electrical current to the stator 22. In certain embodiments, the controller 19 is also configured to control a supply of electrical current to the field component 54 of the brake mechanism 50 during certain applications of the electric motor 10 requiring the stationary position of the output shaft 38, and thereby the rotor 24, to be maintained against the force exerted thereon by the external source (not shown). The electrical current in the field component 54 generates a magnetic field, which causes a movement of the armature 52 from the first position to the second position thereof. In the second position, the armature 52 abuts the field component 54, exerting a mechanical resistive force upon the output shaft 38, and thereby the rotor 24, against the force exerted on the output shaft 38 and the rotor 24 by the external source. As such, a stationary position of the output shaft 38 and the rotor 24 is maintained while the electrical current is supplied to the brake mechanism 50.

During normal operation of the electric motor 10, the stator 22 is energized by the supply of electrical current thereto. The supply of electrical current to the brake mechanism 50 is militated against. As such, the field component 54 of the brake mechanism 50 remains de-energized. Such energization of the stator 22 causes a rotation of the rotor 24 relative to the stator 22, and thereby a rotation of the output shaft 38, to occur during normal operation of the electric motor 10.

In certain applications, however, there is a need to cease the rotation of output shaft 38, and thereby the rotor 24, and maintain a stationary position thereof by exerting a resisting force upon the output shaft 38, and thereby the rotor 24, against a force exerted by an external source. During such operation of the embodiment shown in FIGS. 1-2, the supply of electrical current to the stator 22 is militated against and the brake mechanism 50 is energized by the supply of electrical current to the field component 54. Such de-energization of the stator 22 and energization of field component 54 generates a magnetic field, which causes a movement of the armature 52 from the first position to the second position thereof. In the second position, the armature 52 abuts the field component 54, exerting a mechanical resistive force upon the output shaft 38, and thereby the rotor 24, against the force exerted on the output shaft 38 and the rotor 24 by the external source. As such, a stationary position of the output shaft 38 and the rotor 24 is maintained during certain applications of the electric motor 10.

Figure 4:
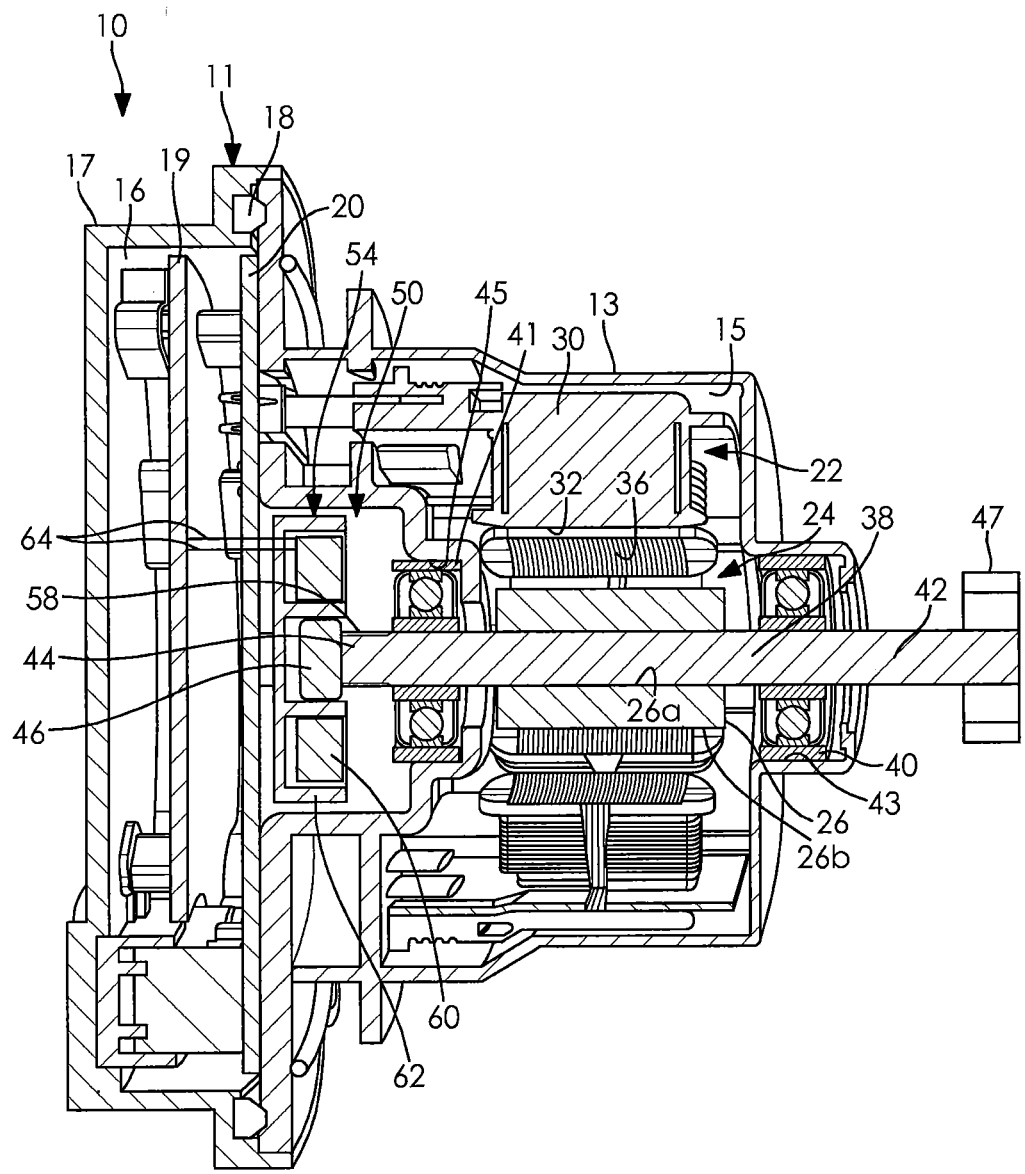
FIG. 4 is a sectional view taken along a longitudinal axis of an electric motor according to yet another embodiment of the subject disclosure, the electric motor including a brake mechanism which produces a magnetic resistive force.

FIG. 4 illustrates another embodiment of an electric motor 100. The embodiment shown in FIG. 4 has many items in common with that of FIGS. 1-2, and to avoid unnecessary repetition of the description, the same reference numerals with a prime symbol (') have been used for substantially similar structure.

In the embodiment shown in FIG. 4, the brake mechanism 150 is a magnetic resistive force brake including a field component 154 in electrical communication with a power source (not depicted). The at least one field component 154 is disposed in the chamber 21' of the second cavity 16'. The at least one field component 154 may be disposed about the second end 44' of the output shaft 38' and the position sensor 46' and fixedly coupled to the casing 11'. Contrarily, the at least one field component 154 may be coupled to the second end 44' of the output shaft 38' and rotatable therewith within the casing 11'. The at least one field component 154 includes at least one electromagnet 160 capable of selectively generating a plurality of eddy currents to produce a magnetic field. In one embodiment where the at least one field component 154 is stationary and fixedly coupled to the casing 11', the magnetic field generated by the at least one field component 154 is configured to attract the output shaft 38'. In other embodiments where the at least one field component 154 is rotatable with the output shaft 38', the magnetic field generated by the at least one field component 154 is configured to be attracted to the casing 11'.

The attraction between the at least one field component 154 and the output shaft 38' or the casing 11' generates a magnetic resistive force therebetween. The magnetic resistive force between the field component 154 and the output shaft 38' or the casing 11' may selectively maintain a stationary position of the output shaft 38', and therefore the rotor 24' against a force exerted by an external source. In certain embodiments, the magnetic resistive force between the field component 154 and the output shaft 38' or the casing 11' provides a greater torque constant than the torque constant of the stator 22' so that less electrical current is required to maintain the stationary position of the rotor 24' than is required during normal operation of the electric motor 100.

It should be appreciated that the electric motor 100 may further include an electrical connection 64' between the controller 19' and the brake mechanism 150. More particularly, the electrical connection 64' shown connects the controller 19' and the field component 154 of the brake mechanism 150. The electrical connection 60' provides electrical communication between the controller 19' and the field component 154 of the brake mechanism 150. Accordingly, separate wiring for the brake mechanism 150 to an external power source and/or controller is not necessary, which minimizes a package size of the electric motor 100.

The controller 19' is configured to control a supply of electrical current to the windings 36' of the stator 22'. The electrical current in the windings 36' of the stator 22' generates a magnetic field, which produces torque by interaction with the permanent magnets pushing the rotor 24' to rotate about the output shaft 38' to a new position. A rotational speed of the electric motor 100 can be adjusted by the controller 19' by varying the supply of electrical current to the stator 22'. In certain embodiments, the controller 19' is also configured to control a supply of electrical current to the at least one field component 154 of the brake mechanism 150 during certain applications of the electric motor 100 requiring the stationary position of the output shaft 38', and thereby the rotor 24', to be maintained against the force exerted thereon by the external source (not shown). The electrical current in the at least one field component 154 generates eddy current and a magnetic field, which produces a magnetic resistive force against the force exerted on the output shaft 38' and the rotor 24' by the external source. As such, a stationary position of the output shaft 38' and the rotor 24 is maintained while the electrical current is supplied to the brake mechanism 150.

During normal operation of the electric motor 100, the stator 22' is energized by the supply of electrical current thereto. The supply of electrical current to the brake mechanism 150 is militated against. As such, the at least one field component 154 of the brake mechanism 150 remains de-energized. Such energization of the stator 22' causes a rotation of the rotor 24' relative to the stator 22', and thereby a rotation of the output shaft 38', to occur during normal operation of the electric motor 100.

In certain applications, however, there is a need to cease the rotation of output shaft 38', and thereby the rotor 24', and maintain a stationary position thereof by exerting a resisting force upon the output shaft 38', and thereby the rotor 24', against a force exerted by an external source. During such operation of the embodiment shown in FIG. 4, the supply of electrical current to the stator 22' is militated against and the brake mechanism 150 is energized by the supply of electrical current to the at least one field component 154. Such de-energization of the stator 22' and energization of the at least one field component 154 generates eddy currents and a magnetic field, which produces a magnetic resistive force against the force exerted on the output shaft 38' and the rotor 24' by the external source. As such, a stationary position of the output shaft 38' and the rotor 24 is maintained during certain applications of the electric motor 100.

In accordance with the provisions of the patent statutes, the present subject matter has been described in what is considered to represent its preferred embodiments. However, it should be noted that the subject matter can be practiced otherwise than as specifically illustrated and described without departing from its spirit or scope.

What is claimed:

1. An electric motor, comprising:
 a casing;

a thermal energy transfer member forms a wall within the casing dividing the casing into two sides;
a rotor disposed in a first side of the casing;
a stator disposed in the first side of the casing adjacent to the rotor;
a shaft at least partially disposed in the first side of the casing and rotatable with the rotor;
a position sensor positioned in the first side of the casing at a first end of the shaft;
a brake mechanism disposed in the first side of the casing, wherein the brake mechanism is configured to selectively maintain a stationary position of the shaft by exerting a resistive force thereupon; and
a controller disposed in a second side of the casing and the controller in electrical communication with the brake mechanism.

2. The electric motor according to claim 1, wherein the brake mechanism includes at least one of an armature and a field component,
the armature is coupled to the first end of the shaft, and
the field component urges the armature to slide along the shaft into contact with the field component, and the contact with the field component resists movement of the shaft.

3. The electric motor according to claim 2, wherein at least one of the armature and field component is disposed about the first end of the shaft.

4. The electric motor according to claim 2, wherein the armature is slidably coupled to the shaft via splines on the first end of the shaft.

5. The electric motor according to claim 2, wherein the field component includes one of a permanent magnet and an electromagnet disposed in a housing.

6. The electric motor according to claim 2, wherein an energization of the field component generates a magnetic field which causes a movement of the armature from a first position to a second position, and wherein the armature in the second position exerts a mechanical resistive force upon the shaft.

7. The electric motor according to claim 1, wherein the brake mechanism comprises a field component surrounding the first end of the shaft, and an energization of the field component generates eddy currents and a magnetic field to exert a magnetic resistive force upon the shaft.

8. The electric motor according to claim 1, wherein the controller is in electrical communication with the stator, and wherein the controller is configured to selectively control a supply of electrical current to the stator and the brake mechanism.

9. The electric motor according to claim 8, wherein the controller is in electrical communication with the brake mechanism via at least one connection passing through the thermal energy transfer member.

10. The electric motor according to claim 1, wherein the brake mechanism is concentrically disposed about the sensor.

11. An electric motor, comprising:
a casing;
a thermal energy transfer member forms a wall within the casing dividing the casing into two sides;
a rotor disposed in a first side of the casing;
a stator disposed in the first side of the casing adjacent to the rotor;
a shaft with a first end disposed in the first side of the casing and rotatable with the rotor;
a position sensor disposed in the first side of the casing between the first end of the shaft and the thermal energy transfer member, and the position sensor configured to sense a position of the rotor;
a brake mechanism disposed in the first side of the casing between the first end of the shaft and the thermal energy transfer member, and a housing of the brake mechanism attached to the thermal energy transfer member, the brake mechanism including at least one field component and an armature attached to the first end of the shaft, wherein the brake mechanism is configured to selectively maintain a stationary position of the rotor by exerting a resistive force upon the shaft; and
a controller disposed in a second side of the casing adjacent to the thermal energy transfer member, wherein the controller is in electrical communication with the stator, the sensor, and the brake mechanism.

12. The electric motor according to claim 11, wherein the at least one field component of the brake mechanism includes at least one of a permanent magnet and an electromagnet disposed in a housing.

13. The electric motor according to claim 12, wherein the wall of formed by thermal energy transfer member forms a portion of the housing of the at least one field component, and the thermal energy transfer member is comprised of ferromagnetic material.

14. The electric motor of claim 11, further comprising electrical connections passing through the thermal energy transfer member to connect the controller on the second side of the casing to the brake mechanism on the first side of the casing.

15. The electric motor of claim 14, wherein the brake mechanism is attached to the wall formed by the thermal energy transfer member.

16. The electric motor of claim 14, wherein the field component of the brake mechanism is attached to the wall formed by the thermal energy transfer member and an armature of the brake mechanism is attached to the first end of the shaft, and
the field component urges the armature toward the field component along the shaft.

17. The electric motor of claim 11, wherein the first end of the shaft is cantilevered.

18. A method for controlling an electric motor, the method comprising the steps of:
providing an electric motor including a casing having, the casing surrounding:
a thermal energy transfer member forming a wall within the casing dividing the casing into two sides;
a rotor, a stator, and a shaft on a first side of the casing;
a brake mechanism attached to a first side of the thermal energy transfer member on the first side of the casing;
a position sensor positioned within the brake mechanism; and
a controller positioned on a second side of the casing; and
selectively supplying an electrical current to one of the stator to cause a rotational movement of the rotor and the brake mechanism to maintain a stationary position of the rotor by exerting a resistive force upon the shaft.

19. The method for controlling the electric motor according to claim 18, wherein a torque constant of the resistive force exerted on the shaft is greater than a torque constant of the force exerted on the shaft by an external source.

* * * * *